United States Patent
Do et al.

(10) Patent No.: US 10,165,105 B1
(45) Date of Patent: Dec. 25, 2018

(54) METHOD AND SYSTEM FOR USER EQUIPMENT COMMUNICATION MODE SELECTION

(71) Applicant: QUALCOMM Incorporated, San Diego, CA (US)

(72) Inventors: Ju-Yong Do, Cupertino, CA (US); Sai Pradeep Venkatraman, Santa Clara, CA (US); Meghna Agrawal, Cupertino, CA (US); Weihua Gao, San Jose, CA (US); Gengsheng Zhang, Cupertino, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/709,065

(22) Filed: Sep. 19, 2017

(51) Int. Cl.
*H04M 3/42* (2006.01)
*H04M 1/725* (2006.01)
*H04W 4/14* (2009.01)

(52) U.S. Cl.
CPC ... *H04M 1/72569* (2013.01); *H04M 1/72566* (2013.01); *H04M 1/72572* (2013.01); *H04W 4/14* (2013.01)

(58) Field of Classification Search
CPC ......... H04M 1/72569; H04M 1/72572; H04M 1/72566; H04W 4/14
USPC ...................................................... 455/414.1
See application file for complete search history.

(56) References Cited

U.S. PATENT DOCUMENTS

| | | | | |
|---|---|---|---|---|
| 8,594,298 | B2* | 11/2013 | Klein | H04M 3/42161 379/211.02 |
| 9,380,146 | B1* | 6/2016 | Gopalakrishnan | G10L 13/08 |
| 2011/0029647 | A1 | 2/2011 | Ginevan et al. | |
| 2016/0142495 | A1 | 5/2016 | Lin et al. | |
| 2016/0360426 | A1* | 12/2016 | Shaw | H04W 4/04 |

FOREIGN PATENT DOCUMENTS

| | | |
|---|---|---|
| CN | 1780217 | 5/2006 |
| WO | 2015/137839 | 9/2015 |

OTHER PUBLICATIONS

"Pedius—Phone Calls for the Deaf", accessed at: http://www.pedius.org/en/ on Jun. 1, 2017, 6 pages.

* cited by examiner

*Primary Examiner* — Amancio Gonzalez
(74) *Attorney, Agent, or Firm* — Thien T. Nguyen (57) ABSTRACT

Disclosed is an apparatus and method for automatic communication mode selection. The method may include detecting a communication by a user equipment. The method may also include determining one or more characteristics associated with the communication, wherein the one or more characteristics comprise user environmental data, public environmental data, or a combination thereof associated with the communication. Furthermore, the method may include selecting a mode for the communication that is different from an original mode of the detected communication based on the one or more characteristics.

30 Claims, 6 Drawing Sheets

METHOD AND SYSTEM FOR USER EQUIPMENT COMMUNICATION MODE SELECTION

FIELD

The subject matter disclosed herein relates generally to mobile device communication systems and methods.

BACKGROUND

Modern communication devices typically support several different modes of communication, including voice communication and text-based communication. When a voice call is initiated by an initiating user, a receiving user will receive the voice call, and both parties will communicate with one another using voice communications. Similarly, when a text-based communication (e.g. short message server (SMS) text messages, multimedia server (MMS) that include media content, etc.) is sent from the initiating user, the receiving user will receive a text-based message, and both parties can communicate in an ongoing text-based dialogue.

It may not be appropriate or desirable, however, to receive a voice call based on factors surrounding a user. For example, it may be late at night, a user may be in a business meeting, a user may be in a museum, etc. If the user were to receive a sudden ring for a voice call, for example when in a meeting, the call would be unwelcome. However, simply rejecting the call by the user is also not always the most desirable outcome from the user's perspective. Similarly, it may not be appropriate to read and respond to a text based messages. For example, a user may be driving, and regulations make it illegal to respond to the text message while driving. Simply ignoring the text based message until a later time may again not be the most desirable course of action for the user.

SUMMARY

In an exemplary embodiment, a communication is detected by a user equipment. One or more characteristics associated with the communication are then determined. For example, the one or more characteristics can include user environmental data, public environmental data, or a combination thereof associated with the communication. A mode for the communication is then selected based on the one or more characteristics. In embodiments, the selected mode of communication is different from an original mode of the detected communication.

In another exemplary embodiment, a device is utilized for automatic communication mode selection, where the device includes a transceiver that sends and receives communications in a plurality of different modes, a memory, and a processor. The processor is used by the device to detect a communication and then determine one or more characteristics associated with that communication. For example, the one or more characteristics can include user environment data, public environmental data, private environmental data, or a combination thereof associated with the communication. Then, based on the one or more characteristics, a mode is selected for the communication that is different from an original mode of the detected communication.

In another exemplary embodiment, an apparatus for automatic communication mode selection can include means for detecting a communication by a user equipment, means for determining one or more characteristics associated with the communication, and means for selecting a mode for the communication that is different from an original mode of the detected communication based on the one or more characteristics. Furthermore, the one or more characteristics may include any combination of user environment data, public environmental data, and private environmental data.

In yet another exemplary embodiment, a non-transitory computer readable storage medium can include instructions that, when executed by a processor, cause the processor to perform operations for automatic communication mode selection. The operations can include detecting a communication by a user equipment. The operations may also include determining one or more characteristics associated with the communication, wherein the one or more characteristics comprise user environment data, public environmental data, private environmental data, or a combination thereof associated with the communication. Furthermore, the operations can include selecting a mode for the communication that is different from an original mode of the detected communication based on the one or more characteristics.

DETAILED DESCRIPTION

A method and system for real time automatic communication mode selection for communications between user equipment is described. In one embodiment, the user equipment is a mobile telephone, such as a smartphone. However, the user equipment may be any device, such as a wearable device, tablet computer, gaming device, medical device, etc. with sufficient computing, memory, battery, and network resources to perform the processes discussed herein. In embodiments, user equipment devices may communicate with one another using various protocols and formats, such as voice communication, text based communication (e.g., short message service text messages, multimedia message service messages, etc.), real-time video communication, etc. However, due to certain environmental factors surrounding the initiation or reception of a communication, certain modes of communication may be preferred over other modes of communication. In the embodiments discussed herein, the use of environmental factors enables user equipment devices and/or communication servers to quickly and accurately select a preferred communication mode, and provide dynamic communication mode conversion between non-preferred and preferred modes.

Figure 1:
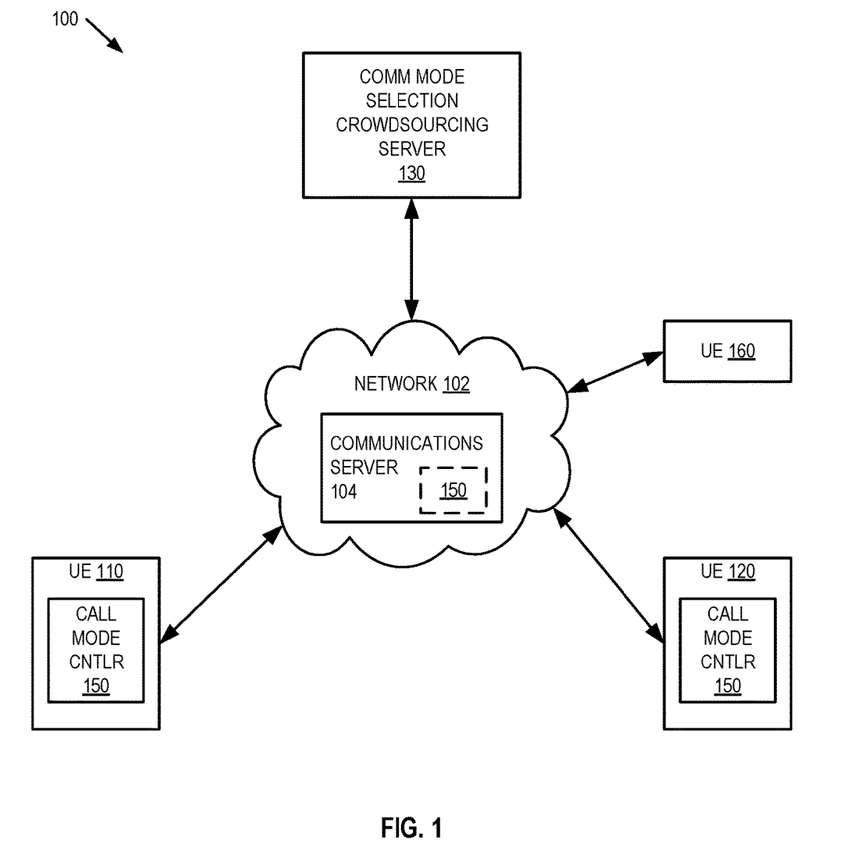
FIG. 1 illustrates one embodiment of a system architecture for real time automatic communication mode selection.

FIG. 1 illustrates a system architecture 100 for real time automatic communication mode selection. The system architecture may include one or more user equipment devices, such as user equipment devices 110, 120, and 160, a communication server 104, and a communications mode selection crowdsourcing server 130. In one embodiment, user equipment devices 110, 120, and 160, communications server 104, and communications mode selection crowdsourcing server 130 are systems, which may include one or more processors, memory, I/O controllers, network interfaces, communication subsystems, displays, etc., as discussed in greater detail herein.

In one embodiment, communications mode selection crowdsourcing server 130 collects a plurality of factors associated with device to device communications. For example, user equipment 110 and user equipment 120, as well as other user equipment devices, may communicate with one another over network 102 (e.g., a LAN, WAN, or combination of networks). As discussed above, these communications may be voice communications (e.g., calls), text-based communications (e.g., SMS, MMS, etc.), real-time video communications, etc. In one embodiment, server 130 collects factors surrounding the placing, receiving, acceptance, rejection, follow-up, and response to initiated communications. Furthermore, server 130 may collect additional factors surrounding a communication, such as public information and optionally private information. For example, server 130 collects public information, such as locations where voice calls are initiated, where text-based messages are initiated, where voice calls are accepted, where voice calls are rejected, where text-based messages are sent in response to a rejected voice call, where text based messages are sent in response to text-based messages, times associated with each action, public information associated with locations (e.g., location corresponds with a movie theatre, and time corresponds with a movie shown at the theatre). In embodiments, the user equipment collects this information and reports it to server 130. Based on one or more user selectable privacy settings (e.g., consent, opting-in, etc.), optional private information can be shared with server 130, such as calendar events in user's calendar, contact categories (e.g., family, business colleague, unknown, etc.), etc. Additional private user preference information can be shared with server 130, such as user-selected preferences (e.g., always accept calls from my children, always perform text-based chat with Friend X, Friend Y call rejection 90% of the time, etc.).

In one embodiment, server 130 collects the public information from a plurality of user equipment devices (e.g., crowd sources the information from UEs 110, 120, as well as other UEs), and generates a call mode selection model. In one embodiment, the model may be a machine learning model (MLM), such as an artificial neural network, trained from the collected public information as to how a response to a communication should be handled based on model, initiator location, receiver location, known public information, known private information, characteristics of locations, as well as other characteristics surrounding a communication. In embodiments, the server 130 aggregates call placement, acceptance, rejection, and responses upon rejection from the plurality of UEs when generating the MLM. Furthermore, in one embodiment, personal information and/or private information may also be received by server 130 by specific UEs so that a generalized crowdsourced model may be further trained to create one or more user-specific communication mode selection model(s). In another embodiment, a user equipment device, such as user equipment 110, may locally incorporate private information and/or preferences into a model generated from public information and received from server 130. In this embodiment, the user equipment device would perform additional MLM analysis based on private information and/or preferences to further train a received call mode selection model.

In either of the embodiments, server 130 utilizes the model to generate a mapping from environmental communication factors (e.g., one or more characteristics surrounding a communication to be initiated, or a newly received communication) to a preferred mode of communication. In one embodiment, the mapping can include generating a four-dimensional map of communication mode preferences in two-dimensional location, time, contact status (e.g., known, unknown, specific contact of a user), and per activity (e.g., what user is currently doing, such as calendar events). In embodiments, the mapping can reside in user equipment (e.g., part of a call mode controller 150 of user equipment 110 and/or 120) and/or in a call mode controller 150 of a communications server 104 that will handle communications between different user equipment devices. As will be discussed in greater detail below, the call mode controllers 150 are responsible for accessing a call mode selection map and determining a preferred mode of communication, and then optionally dynamically converting between different communication modes to the preferred mode.

In one embodiment, when a communication is initiated from user equipment 110 to user equipment 120, for example when a user selects a contact to communicate with, the call mode controller 150 of user equipment 110 consults the MLM trained mapping to determine a mode for the communication (e.g., text or voice) based on characteristics surrounding the communication initiation (e.g., current location of user equipment 110, local time of day, preferences for selected contact if known, calendar events, public information associated with time/location, etc.). The selected mode of communication is then automatically selected for the user of user equipment 120. The user of user equipment may then contact the user equipment 120 using the selected mode of communication, or another mode of communication should the selected mode be overridden by a user.

In one embodiment, user equipment 120 receives the communication in the selected mode, and call mode controller 150 of user equipment 120 consults its MLM trained mapping to determine a preferred mode of communication based on environmental characteristics surrounding the communication reception (e.g., current location of user equipment 120, local time of day, preferences associated with the incoming contact if known, calendar events, public information associated with time/location, which device(s) a user is currently using for communications, such as collaborative communication using one or more of a smart phone, a smart watch, a tablet, or another combination interconnected user equipment devices, etc.).

In one embodiment, the selected mode of the communication from the initiator may be different from the selected mode of communication from the receiver (e.g., UE 110 places a voice call, but call mode controller 150 of UE 120 selects to receive text, or UE 110 sends a text message, but call mode controller 150 of UE 120 selects to receive voice communication). Furthermore, in embodiments, the selected mode for receiving a communication and a selected mode for responding to a communication may be different for the same communications session (e.g., upon detecting that a user has headphones connected to UE 120 via a wired or wireless connection, incoming voice call data is routed through the headphones, but outgoing communications/ responses are handled as text-based communications).

In embodiments, the receiver user equipment (e.g., user equipment 120) can perform voice-to-text or text-to-voice conversion as needed based on mismatched communication modes. However, in embodiments, the communication initiator device may alternatively perform communication mode conversion, for example, upon receiving notice that the receiver has selected a different communication mode, as well as to convert a communication to a common delivery format (e.g., all communications sent as voice regardless of selected communication mode). Furthermore, embodiments that utilize text-to-speech conversion may further utilize machine learning trained voice simulators to simulate a voice of one of the parties to the communication including timbre, cadence, rhythm, etc.

In one embodiment, communication mode selection and/or conversion may be used by call mode controller 150 of either user equipment 110 or 120 to handle multiple simultaneous communications from different sources that seek to use the same communications channel. For example, user equipment 120 may be participating in a voice conversation with user equipment 110, when another communication is received by user equipment 120 from user equipment 160. When the communication from user equipment 160 is a voice communication or is a text-based communication that is mapped for conversion to voice communication, call mode controller 150 of user equipment 120 can select to convert the received communication to an available communication channel while the preferred or original communication channel is being used by user equipment. In the example discussed above, the available communication channel would be a text-based communication channel, and call mode controller 150 would therefore convert incoming voice communications from user equipment 160 (as well as other user equipment) to text-based communications, or would prevent up-conversion of text-based communications to voice communications, while the voice communication channel is in use by user equipment 120. In one embodiment, upon call mode controller 150 detecting the voice communication channel becoming available at UE 120 (e.g., based upon the termination of an ongoing call), call mode controller 150 can allow the incoming communications from user equipment 160 to proceed under its original communication type (e.g., voice) or may begin conversion from an original communication type (e.g. text-based) to a preferred communication type (e.g., voice).

As described in the above example, the transition between selected modes of communication can be dynamic based on monitored environmental factors surrounding an ongoing exchange of communications. That is, as environmental factors change (e.g., UE moves location, a voice call preference associated with always accepting, a calendar event begins, a movie time indicates start time, etc.), communication mode selection may also dynamically change to suit the changing factors. In this embodiment, an ongoing exchange of communications can be dynamically converted in response to the detected change in one or more relevant environmental factors, to ensure that an appropriate mode of communication is adaptively selected and used. In embodiments, however, before changing a format of an ongoing exchange of communications, a user interface pop-up or warning may be generated by user equipment to give a user the chance to maintain the format of an ongoing exchange of communications.

Figure 2:
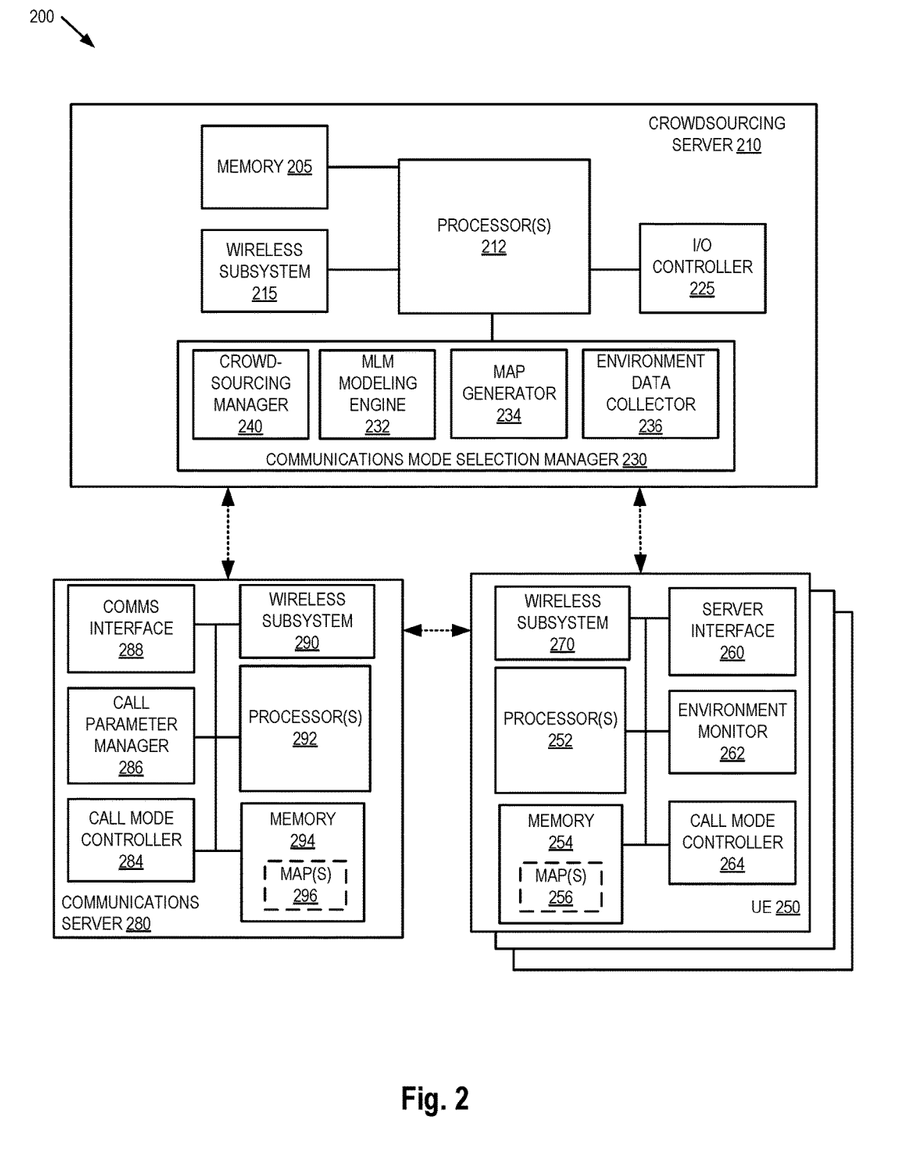
FIG. 2 is block diagram of one embodiment of a communications mode selection server, user equipment, and a crowdsourcing server.

FIG. 2 is block diagram of one embodiment 200 of crowdsourcing server 210, a plurality of user equipment devices, such as UE 250, and a communication server 280. In one embodiment, crowdsourcing server 210, UE 250, and communications server 280 provide additional details for the communications mode selection crowdsourcing server 130, UE devices 110, 120, and 160, and communication server 104 discussed above in FIG. 1.

In one embodiment, user equipment 250 is a system such as a mobile telephone, tablet computer, wearable device, etc., which may include one or more processors 252, a memory 254, and a wireless subsystem 270. User equipment 250 may also include a number of processing modules, which may be implemented as hardware, software, firmware, or a combination, such as the server interface 260, environment monitor 262, and a call mode controller 264. It should be appreciated that user equipment 250 may also include, although not illustrated, a user interface (e.g., keyboard, touch-screen, microphones, speakers, or similar devices), a power device (e.g., a battery), as well as other components typically associated with electronic devices. Wireless subsystem 270 may include a number of wireless communications transceivers that transmit and receive data streams through wireless link associated with various types of wireless networks (e.g., Bluetooth, WLAN, WiFi, Cellular, or other networks). In one embodiment, wireless subsystem 270 communicatively couples user equipment 250 to communications server 280, crowdsourcing server 210, and zero or more additional user equipment devices (e.g., a smart watch, a gaming device, a medical device, a tablet computer, etc. that are also capable of participating in communications discussed herein).

In one embodiment, crowdsourcing server 210 and communications server 280 are also systems, which may include one or more processor(s) (e.g., processors 212 and 292), memory (e.g., memory 205 and memory 294), and wireless subsystems (e.g., wireless subsystems 290 and 215). Crowdsourcing server 210 and communication server 280 may also include a number of processing modules, which may be implemented as hardware, software, firmware, or a combination. In one embodiment, crowdsourcing server 210 includes a communications mode selection manager 230, including a crowdsourcing manager 240, a machine learning model (MLM) modeling engine 232, a map generator 234, and an environment data collector 236. In one embodiment, communications server 280 includes a communications interface 288, a call parameter manager 286, and a call mode controller 284. It should be appreciated that crowdsourcing server 210 and/or communication server 280 may also include, although not illustrated, a user interface (e.g., keyboard, touch-screen, or similar devices), a power device (e.g., a battery), a display screen (e.g., an LCD display), as well as other components typically associated with computer processing systems.

In embodiments, the memories (e.g., memory 205, memory 294, and memory 254) may be coupled to a processor to store instructions for execution by the processors, such as processor (s) 212, processor(s) 252, and processors 292. In some embodiments, the memory is non-transitory, and may store one or more modules (e.g., the communications mode selection manger 230, call mode controller 264, call parameter manager 286, etc. discussed above), to implement embodiments described herein. It should be appreciated that the embodiments as will be hereinafter described may be implemented through the execution of instructions, for example as stored in memory or other element, by processor(s) and/or other circuitry of crowdsourcing server 210, user equipment 250, and communications server 280. Particularly, circuitry of user crowdsourcing server 210, user equipment 250, and communications server 280, including but not limited to processor(s) 212, processor(s) 252, and processor(s) 292 may operate under the control of a program, routine, or the execution of instructions to execute methods or processes in accordance with the aspects and features described herein. For example, such a program may be implemented in firmware or software (e.g. stored in memory 205, memory 254, and/or memory 294) and may be implemented by processors, such as processor(s) 212, processor(s) 252, and processor(s) 292, and/or other circuitry. Further, it should be appreciated that the terms processor, microprocessor, circuitry, controller, etc., may refer to any type of logic or circuitry capable of executing logic, commands, instructions, software, firmware, functionality and the like.

In one embodiment, communications mode selection manager 230 of crowdsourcing server 210 is responsible for collecting environmental data from one or more user equipment devices 250. Environment data collector 236 interfaces with user equipment 250 over a wireless link established by wireless subsystem 215 and 270. Environment data collector 236 receives environmental data, both public and private (based on permissions), surrounding the placement, reception, acceptance, rejection, and actions taken following a rejection of communications at user equipment 250. In one embodiment, environment monitor 262 of user equipment 250 gathers the environment data surrounding each communication, and server interface 260 communicates the environment data to collector 236. Environmental data collector 236 then stores the environment data in memory 205, including such factors as locations where communications were placed, locations where communications were received, what type of communication was initiated, duration of a communication, volume levels, which devices are available to users and how those devices are capable of handling communications, switches between communication modes (e.g., transitioning from voice call to text message), GPS information, time of communication, whether user is already on a call, whether traveling in a car as a driver or passenger, a current device configuration (e.g., do not disturb setting, headphones being used, ring mode active, etc.), as well as other environmental data surrounding communications. In one embodiment, environment data collector 236 also obtains additional environment data, such as pre-known public information associated with locations (e.g., location associated with museum, school, shopping mall, movie theatre, etc.), scheduled events (e.g., times of movies at the theatre, baseball game schedule), pre-known private information (e.g., scheduled meeting times in a calendar of a user of user equipment 250), and preferences per user contact (e.g., friend A=always chat, Friend B=90% call rejection, Friend C=default action, etc.).

In one embodiment, crowdsourcing manager 240 periodically causes MLM modeling engine 232 to access the collected environment data stored in memory 205. MLM modeling engine 232 then performs a machine learning based analysis of the collected environment data to train or refine a machine learning model (e.g., a communications mode selection model). For example, the environment data may be input data to an artificial neural network, with an output of the artificial neural network being probabilities of different modes of communication. The artificial neural network can then be iteratively trained using machine learning techniques based on the ongoing aggregation and collection of environment data and associated communication mode actions (e.g., placement, rejection, follow-up etc. with a given communications mode), as well as retrained and/or refined based on any additional collected environment data and associated communication mode selections.

In one embodiment, map generator 234 accesses the trained communications mode selection model and generates a four-dimensional map of communication mode preferences. In one embodiment, the four-dimensional map includes 2D location associated with a communication event, time, per contract, and per activity, which are mapped to a preferred mode of communication. For example, communications from Contact A are mapped to a voice communication mode if between 6-10 PM and at home, and are otherwise mapped to text mode. As another example, communications from Contact B are always mapped to voice communication mode, except if in restricted locations (e.g., a theatre, meeting, classroom, etc.). As yet another example, communications from Contact C are text mode always with a user interface message enabling a mode switch.

In embodiments, map generator 234 may generate more than one type of communication mode selection map, such as public maps and private maps. For example, a public map can be a four-dimensional mapping of environment factors to call mode selections, which is generated based on an overall population's preferences (e.g., based on the overall aggregated environment data, known public information, etc.). In contrast, a private map, which is also a four-dimensional mapping of environment factors to call mode selections, utilizes the overall population preferences supplemented with personalized environment data (e.g., communication mode actions with respect to specific contacts, specific locations not associated with public locations, specific devices available to a user, etc.) and/or explicitly defined preferences (e.g., always accept calls from Contact Child). Map generator 234 may further periodically generate new maps based on retrained and/or refined machine learning models, as discussed herein.

In one embodiment, after training and/or retraining, crowd sourcing manager 240 distributes one or more of the generated communication mode selection map(s) to user equipment devices (e.g., UE 250) and/or communications server 280. In other embodiments, however, the trained machine learning models themselves (e.g., artificial neural networks, Bayesian networks, decision trees, etc.) are distributed to user equipment devices (e.g., UE 250) and/or communications server 280, which may be directly used by the receiving device(s) for communication mode selection. In either embodiment, the map(s) (e.g., map(s) 256 and 296) are stored in the respective memories (e.g., memory 254 and memory 294). In embodiments, private maps, when available, are distributed to user equipment devices 250. Public maps, such as those based on overall population preferences, are distributed to communications server 280, as well as to UE 250 when there are no personal maps for UE 250. In embodiments, private maps are only distributed to other systems, such as communications server 280, based on user consent.

In one embodiment, call mode controller 264 of UE 250 may then utilize the stored map(s) when initiating or receiving a communication. In response to detecting a communication (e.g., initiation or response), call mode controller 264 obtains environment data from environment monitor 262. The environment data can include such data as time, location, contact associated with a communication, personal preferences, activity, etc. Additional data, such as calendar activities, which devices a user currently has available for handling incoming/outgoing communications (e.g., smart phone, smart watch, tablet, gaming device, medical device, fitness device, etc.), how their devices are currently configured (e.g., silent mode, do not disturb mode, headphones in, ringer on, etc.), capabilities of those devices (e.g., image display capabilities, text display capabilities, etc.) may also accessed by environment monitor 262 when determining an overall environment surrounding UE 250, as well as other user equipment devices. This environment data, which is provided to call mode controller 264, enables call mode controller 264 to evaluate the call mode selection map 256 (or alternatively a MLM) based on the current environment data. In one embodiment, the evaluation results in call mode controller 264 selecting a preferred mode of the communication. When UE 250 initiates communication, the selected mode may be automatically used upon selection of a contact. When UE 250 receives a communication, the mode selection can be used to determine the preferred mode. Furthermore, as discussed in greater detail herein, when the selected preferred mode is different from the mode of the received communication, call mode controller 264 may further convert the mode of communication (e.g., down convert speech to text, up convert text to speech, disable a media type such as presenting only audio from a video-based communication that includes both audio and video, etc.). Because the call mode selection is based on the population's preferences and/or a user's own personal preferences, a preferred mode of communication can be accurately selected given a various combination of environmental factors. Furthermore, when necessary, the communication mode can be dynamically converted between formats to present a communication to a user in a selected communication mode.

In one embodiment, instead of UE 250 performing communication mode selection, call mode controller 284 of communications server 280 may also perform communication mode selection. In this embodiment, communication server 280 is an intermediary communications server that facilitates communications between UE 250 and another UE device. For example, communications server 280 may be a wireless network base station, cell site, WLAN access point, etc. In response to detecting a communication between UE 250 and another UE device, call parameter manager 286 obtains environment data from both the environment monitors 262 of the UE devices, which is established through communications between communications interface 288 and server interface 260. Call mode controller 284 of the communications server 280 may then access one or more communication mode selection map(s) 296 (e.g., public and/or private when available) and analyzes the environment data factors associated with each party of the pending communications. Based on results of the evaluation, call mode controller 284 may either set up the communication between UE 250 and another UE, or may perform any necessary communication mode conversions. In this embodiment, the communications server 280 acts as a central source for communication mode selection and communication format conversion, which relieves computational burdens from the user equipment devices.

In embodiments, a common format is used to transmit communications between initiator and responder UE devices, regardless of selected preferred communication modes. For example, all communications between UEs may be transmitted between the UEs as voice communications. In this embodiment, where a text communication mode is selected for use by a UE, a communication mode conversion is utilized upon communication receipt and communication sending. Furthermore, to facilitate efficient and accurate conversion, communication initiators and/or responders can share environment data, such as those effecting call mode selection map input parameters. This may enable a communication to be initiated in a potentially non-preferred mode, but which would be more efficient given the exchanged environment factors.

Figure 3:
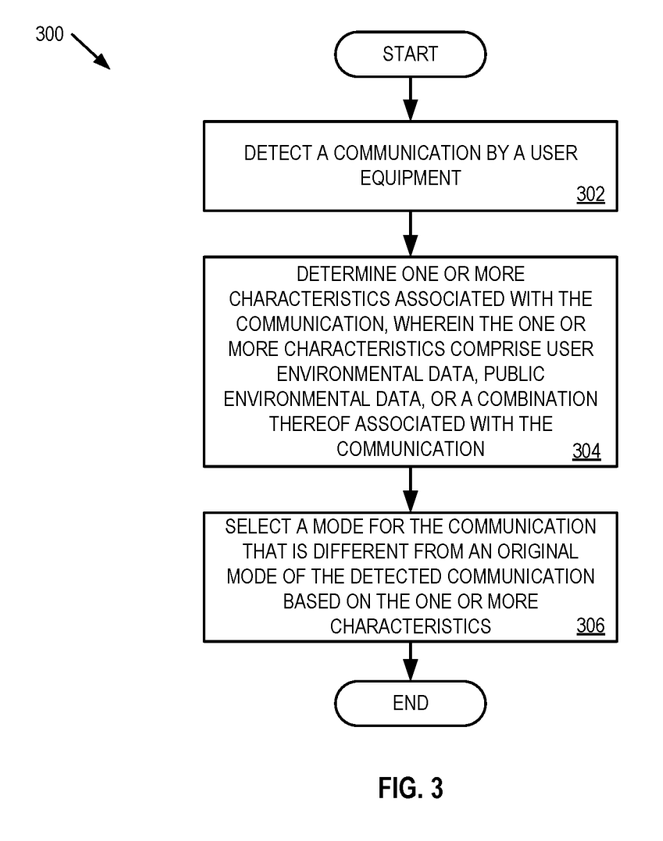
FIG. 3 is a flow diagram of an embodiment of a method for communication mode selection for a user equipment.

FIG. 3 is a flow diagram of an embodiment of a method 300 for communication mode selection for a user equipment. The method 300 is performed by processing logic that may comprise hardware (circuitry, dedicated logic, etc.), software (such as is run on a general purpose computer system or a dedicated machine), firmware, or a combination. In one embodiment, the method 300 is performed by a user equipment device (e.g., user equipment 110, 120, or 250).

Referring to FIG. 3, processing logic begins by detecting a communication by a user equipment (processing block 302). As discussed herein the communication may be one of a plurality of different modes of communication, such as text-based, voice, real-time video including image data and audio data, etc. Furthermore, the detection of a communication may be performed to detect both outgoing communications and incoming communications.

Processing logic then determines one or more characteristics associated with the communication, wherein the one or more characteristics comprise user environmental data, public environmental data, or a combination thereof associated with the communication (processing block 304). For example, the user environmental data can include characteristics, such as, location of user equipment, time of day, a type of the user equipment (e.g., smart phone, tablet, etc.), a current configuration of the user equipment, a status of a contact associated with the communication, as well as other user environmental data characteristic discussed herein. As another example, the public environmental data can include characteristics, such as, data or characteristics associated with the location of the UE, a time the communication was detected, as well as other public characteristics discussed herein. In one embodiment, the one or more characteristics can further include private environmental data, such as, one or more personal preferences associated with specific contacts, time of day, location, etc., a calendar event that conflicts with the communication, as well as other private characteristics discussed herein. In embodiments, the one or more characteristics determined by processing logic may include a combination of a plurality of different environmental factors surrounding the detected communication (e.g., any combination of the user, public, private, and other environmental data discussed herein).

Processing logic selects a mode for the communication that is different from an original mode of the detected communication based on the one or more characteristics (processing block 306). As discussed herein, processing logic may analyze the one or more characteristics associated with the communication using a mapping of various environmental factors to preferred modes of communications. In one embodiment, the analysis can include inputting the one or more characteristics into a trained MLM that outputs probabilities associated with different modes of communication. In another embodiment, the analysis can include mapping the one or more characteristics to a preferred mode of communications. In either embodiment, the analysis results in the selection of one of a plurality of different modes of communication as a preferred communications mode, such as selection of a different mode of communication than the originally detected communication mode.

In embodiments, processing blocks 302 and 304 may be performed periodically or at each new communication sent/received by the user equipment. In this embodiment, the determination of new environmental characteristics associated with newly detection communications enables processing logic to dynamically change a communication mode selection in real time as one or more environmental factors change. Thus, processing logic may adapt communication mode selection in a way that best suits a user's current environment.

Figure 4:
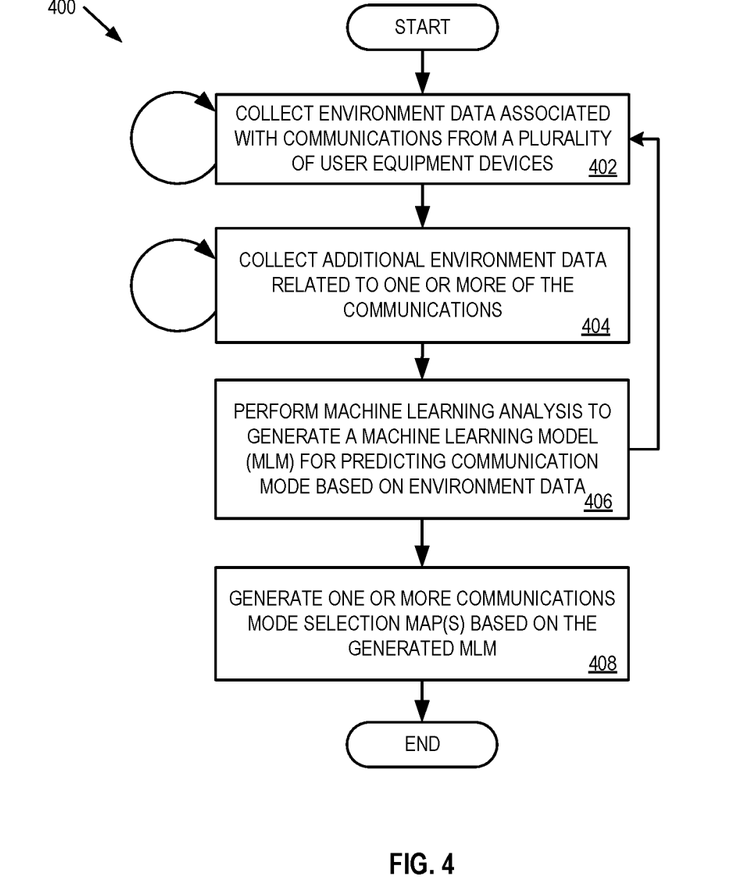
FIG. 4 is a flow diagram of a crowdsourcing server generating one or more communication mode selection maps.

FIG. 4 is a flow diagram of an embodiment of a method 400 for a crowdsourcing server generating one or more communication mode selection maps. The method 400 is performed by processing logic that may comprise hardware (circuitry, dedicated logic, etc.), software (such as is run on a general purpose computer system or a dedicated machine), firmware, or a combination. In one embodiment, the method 400 is performed by a server computer system (e.g., communications mode selection crowdsourcing server 130 or crowdsourcing server 210).

Referring to FIG. 4, processing logic begins by collecting environmental data associated with communications from a plurality of user equipment devices (processing block 402). In embodiments, the collection can include reported environmental data captured by a plurality of different UE devices associated with various modes of communication. For example, each UE device may collect and report to processing logic a type of communication, a location of the communication, a duration of the communication, a time of day, a contact status of the communication, etc.

Processing logic then collects additional environmental data related to one or more of the communications (processing block 404). In one embodiment, the additional environment data may include publicly known data associated with one or more of the environment data factors surrounding a communication, as well as optional private information surrounding a communication. The public information can include, for example, publicly known location information associated with a location of a communication (e.g., communication occurred at a movie theatre, museum, place of business, etc.), information associated with the location data (e.g., times of movies at theatre, locations of exhibits at museum, whether it is normal business hours for the business at the location, etc.). The private information can include, for example, information shared by the user equipment devices that report their environmental factors, such as, status of a contact associated with a communication, defined preferences for specific contacts, etc. As discussed herein, the private information is provided to processing logic by user equipment with the consent of a user.

In embodiments, processing blocks 402 and 404 are periodically or continuously performed so that processing logic can aggregate an extensive corpus of communication mode usage and environmental factor data.

Processing logic performs a machine learning analysis to generate a machine learning model (MLM) for predicting communication mode based on environment data (processing block 406). In embodiments, processing logic utilizes a machine learning technique, such as recursively training an artificial neural network, utilizing the environment data collected at processing blocks 402 and 404. The various factors would therefore be the inputs to the machine learning model being trained, with outputs being potential modes of communication. Furthermore, in embodiments, the training of the MLM may be performed periodically to retrain the MLM as new environment data is collected, by returning to processing block 402.

Processing logic then generates one or more communications mode selection map(s) based on the generated MLM (processing block 408). As discussed herein, the communications mode selection map(s) may be multidimensional maps that enable the mapping of certain environmental characteristics to preferred modes of communication. For example, processing logic may generate one or more four dimensional mappings from 2D communication location, time, contact, and activity to one of a plurality of different modes of communication. Furthermore, the mappings can be both generalized (e.g., reflecting preferences of a population based on public information) or personalized (e.g., including specific user environment data and defined preferences).

As discussed herein, the generated map(s) are then distributed to user equipment and/or communications servers. The user equipment devices may then perform automatic and dynamic communication mode selection using the distributed public and/or private map(s).

Figure 5A:
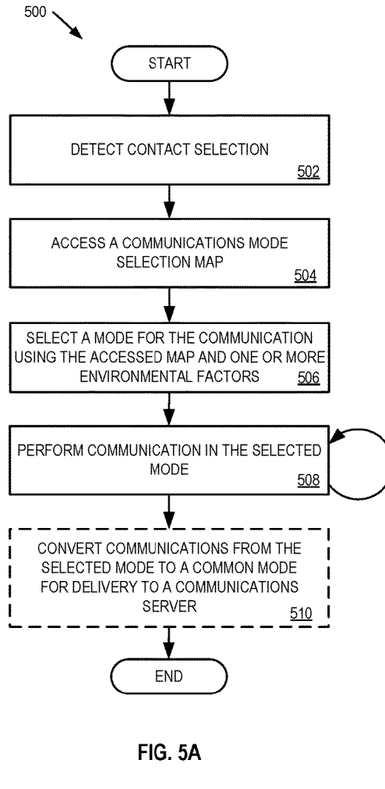
FIG. 5A is a flow diagram of an embodiment of a method for performing communications initiated by user equipment in a selected communications mode.

FIG. 5A is a flow diagram of an embodiment of a method 500 for performing communications initiated by user equipment in a selected communications mode. The method 500 is performed by processing logic that may comprise hardware (circuitry, dedicated logic, etc.), software (such as is run on a general purpose computer system or a dedicated machine), firmware, or a combination. In one embodiment, the method 500 is performed by a user equipment device (e.g., user equipment 110, 120, or 250).

Referring to FIG. 5A, processing logic begins by detecting contact selection (processing block 502). Contact selection can include a user selecting a contact in a directory displayed by the user equipment device. Other forms of contact selection, such as a user entering a number, name, etc. which are associated by the user equipment device with a pre-stored contact, may also be detected by processing logic.

Processing logic then accesses a communications mode selection map (processing block 504). In embodiments, the map may be either a public map or a private map. Processing logic utilizes the map to select a mode for the communication using the accessed map and one or more environmental factors (processing block 506). In embodiments, an environment data collector of the user equipment device (e.g., environment monitor 262) collects various environmental characteristics, such as location, time, contact status, calendar events, user preferences, etc. Each of these environmental factors is used as input to the map for making the communications mode selection. In embodiments, the communication mode selection can include selecting, for example, a text-based communication mode, a voice based communication mode, a real-time audiovisual communications mode, etc. Processing logic then performs communication in the selected mode (processing block 508).

In one embodiment, processing logic may optionally convert communications from the selected mode to a common mode for delivery to a communications server (processing block 510). For example, regardless of selected communications mode, all outgoing communications of user equipment are converted to voice communication.

Figure 5B:
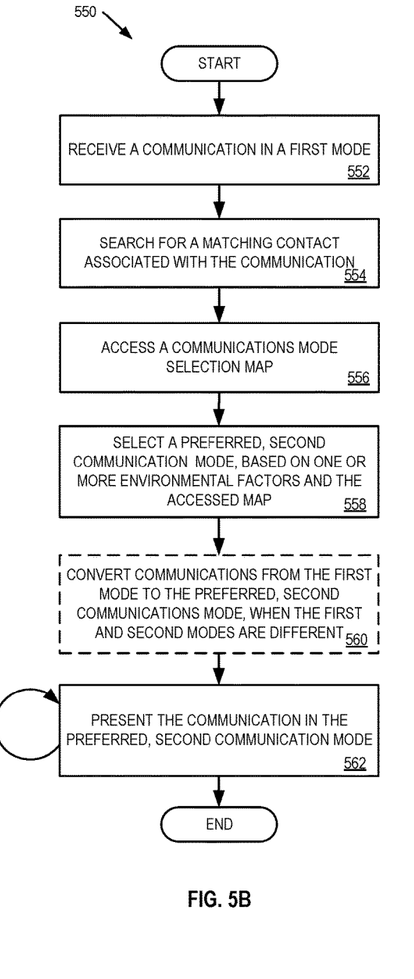
FIG. 5B is a flow diagram of an embodiment of a method for performing communications received by user equipment in a selected communications mode.

FIG. 5B is a flow diagram of an embodiment of a method 550 for performing communications received by user equipment in a selected communications mode. The method 550 is performed by processing logic that may comprise hardware (circuitry, dedicated logic, etc.), software (such as is run on a general purpose computer system or a dedicated machine), firmware, or a combination. In one embodiment, the method 550 is performed by a user equipment device (e.g., user equipment 110, 120, or 250).

Referring to FIG. 5B, processing logic begins by receiving a communication in a first mode (processing block 552). As discussed herein, the communication may one of a plurality of different modes of communication, such as voice, text, video, etc. In response to the communication, processing logic searches for a matching contact associated with the communication (processing block 554), and accesses a communication mode selection map (processing block 556).

As discussed herein, processing logic may then select a preferred, second communication mode, based on one or more environmental factors and the accessed map (processing block 558). The environmental factors can include a wide range of factors, such as current location, time, activity status, contact status, how a device is currently configured, what devices are available to handle a communication, etc. Furthermore, in embodiments, because the preferred, second communication mode may be different from the first communication mode, processing logic may convert communications from the first mode to the preferred, second communications (processing block 560). In embodiments, conversion can include performing voice to text conversion, performing text to voice conversion, disabling a media channel (e.g., delivering audio data but disabling the delivery of video data for an incoming video conference), selecting different modes for incoming and outgoing communications based on current device configuration(s) and performing appropriate conversion(s) (e.g., deliver received voice communications through a detected engaged headphone and converting text messages to voice as response communications), preparing a communication for delivery to a user in one or more of the user's associated devices with and/or without mode conversion (e.g., providing real time converted voice-to-text data to a user's smart watch while at the same time routing the original voice data through headphones connected to a smart phone), generating different versions of the same communications to different devices (e.g., fast and efficient real-time voice-to-text conversion data is generated for providing to a first device while enhanced voice-to-text conversion data, such as text data including accompanying images, links to associated applications, etc., generated in near real time for providing to a second device having more capabilities than the first device), etc.

Processing logic then presents the communications in the preferred, second communications mode to a user of the user equipment device (processing block 562).

Figure 6:
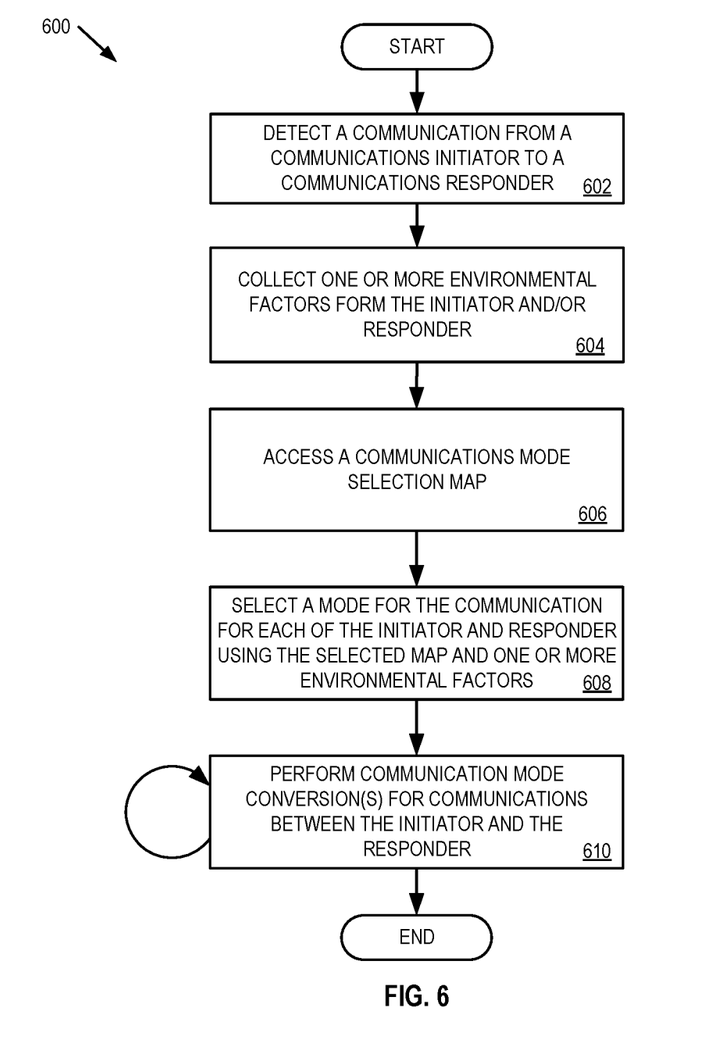
FIG. 6 is a flow diagram of an embodiment of a method for a communications server providing communications in selected modes to a communications initiator and a communications responder.

FIG. 6 is a flow diagram of an embodiment of a method 600 for a communications server providing communications in selected modes to a communications initiator and a communications responder. The method 600 is performed by processing logic that may comprise hardware (circuitry, dedicated logic, etc.), software (such as is run on a general purpose computer system or a dedicated machine), firmware, or a combination. In one embodiment, the method 600 is performed by a server computer system (e.g., communications server 104).

Referring to FIG. 6, processing logic begins by detecting a communication from a communications initiator to a communications responder (processing block 602). In one embodiment, since processing logic resides in a communications server, processing logic can detect new communications between different user equipment devices, such as by monitoring for the exchange of various control data, service requests, or other data objects during the establishment of new device to device communications.

Processing logic then collects one or more environmental factors from the initiator and/or responder (processing block 604). In embodiments, one or more of the initiator and/or responder may collect and report environmental data factors to processing logic, such as associated locations, time, contact status, and other environmental factors discussed herein. Furthermore, processing logic can collect and use known public information, such as associating reported UE locations with known public locations (e.g., movie theatres, sports complexes, museums, businesses, etc.).

Processing logic then accesses a communications mode selection map (processing block 606), and selects a mode for the communication for each of the initiator and the responder using the selected map and one or more environmental factors (processing block 608). In embodiments, processing logic may access more than one map, such as accessing a public map and a private map associated with a UE device and/or a user, when available.

Based on the selected communications mode for each user equipment device, processing logic can perform communication mode conversion(s), as necessary, for communications exchanged between the initiator and responder (processing block 610).

It should be appreciated that when the devices discussed herein include mobile devices (e.g., user equipment), crowdsourcing servers, communications servers, etc., that the devices may communicate via one or more wireless communication links through a wireless network that are based on or otherwise support any suitable wireless communication technology. For example, in some aspects, the devices may associate with a network including a wireless network. In some aspects, the wireless connections discussed herein form networks, which may comprise a body area network, a personal area network (e.g., an ultra-wideband network), as well as other types of networks. In some aspects the network may comprise a local area network or a wide area network. A device may support or otherwise use one or more of a variety of wireless communication technologies, protocols, or standards such as, for example, CDMA, GSM, WCDMA, LTE, TD-SCDMA, TDMA, OFDM, OFDMA, WiMAX, and Wi-Fi. Similarly, a device may support or otherwise use one or more of a variety of corresponding modulation or multiplexing schemes. A device may then wirelessly communicate with other mobile devices, cell phones, wearable devices, servers, other wired and wireless computers, Internet web-sites, etc.

The teachings herein may be incorporated into (e.g., implemented within or performed by) a variety of apparatuses (e.g., devices). For example, one or more aspects taught herein may be incorporated into a phone (e.g., a cellular phone), a personal data assistant (PDA), a tablet, a mobile computer, a laptop computer, a tablet, an entertainment device (e.g., a music or video device), a fitness device (e.g., a biometric sensor, a pedometer, etc.), a wearable device (e.g., a smartwatch), a smart system (e.g., a smart appliance, a smart automobile, a smart robot, or other smart device), a server computer system, or any other suitable device.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the embodiments described herein.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software as a computer program product, the functions may be stored on or transmitted over as one or more instructions or code on a non-transitory computer-readable medium. Computer-readable media can include both computer storage media and communication media including any medium that facilitates transfer of a computer program from one place to another. A storage media may be any available media that can be accessed by a computer. By way of example, and not limitation, such non-transitory computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a web site, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of non-transitory computer-readable media.

The previous description is provided so that any person skilled in the art can make or use the embodiments described herein. Various modifications to these embodiments will be readily apparent to those skilled in the art, and the generic principles defined herein may be applied to other embodiments without departing from the spirit or scope of the described embodiments. Thus, the aspects and features described herein are not intended to be limited, but are to be accorded the widest scope consistent with the principles and novel features disclosed herein.

What is claimed is:

1. A method for automatic communication mode selection, comprising:
    detecting a communication by a user equipment;
    determining one or more characteristics associated with the detected communication, wherein the one or more characteristics comprise user environmental data, public environmental data, or a combination thereof associated with the detected communication, and wherein the detected communication is one of a voice communication, a text-based communication, an audiovisual-based communication, or a combination thereof;
    selecting a mode for the detected communication that is different from an original mode of the detected communication based on the one or more characteristics, wherein the selected mode for the detected communication is a first mode of communication and the detected communication is in a second mode of communication, and wherein the selecting the mode for the detected communication comprises using the one or more characteristics and a map generated by a trained machine learning model to map the detected communication with the first mode of communication;
    converting the detected communication from the second mode of communication to the first mode of communication; and
    providing the converted communication to a user of the user equipment.

2. The method of claim 1, further comprising:
    obtaining a plurality of characteristics associated with a plurality of communications initiated or received by a plurality of users;
    determining how each of the plurality of communications was handled by a communications initiator, a communications receiver, or both; and
    training the machine learning model for automatic communication mode selection based on how each of the plurality of communications was handled and one or more characteristics associated with each of the plurality of communications.

3. The method of claim 2, wherein the plurality of characteristics comprise one or more environmental factors reported by a user equipment device that participated in a communication.

4. The method of claim 3, further comprising:
    obtaining a second plurality of characteristics associated with a second plurality of communications initiated or received by a user associated with the user equipment;

determining how each of the plurality of communications was handled by the user of the user equipment; and refining the trained machine learning model to generate a user-specific machine learning model for automatic communication mode selection based on how each of the plurality of communications was handled by the user of the user equipment.

5. The method of claim 4, further comprising:

receiving private data from the user equipment, wherein the private data comprises at least user defined communication mode preferences per contact, user defined communication mode preferences per time preferences, user defined communication mode preferences per location, user calendar events data, or a combination thereof; and refining the trained machine learning model to generate a user-specific machine learning model for automatic communication mode selection based on the private data.

6. The method of claim 1, further comprising:

determining that the selected mode of communication is unavailable;

providing the detected communication to a user of the user equipment in a different mode of communication regardless of the one or more characteristics associated with the detected communication; and in response to a determination that the selected mode of communication becomes available, providing the detected communication to the user of the user equipment in the selected mode of communication.

7. The method of claim 1, wherein the one or more characteristics comprising the user environmental data, public environmental data, or a combination thereof associated with the detected communication comprise:

one or more user environmental data characteristics comprising a location of the user equipment, a type of the detected communication, a type of the user equipment, a time associated with the detected communication, an activity being performed by the user equipment, a contact associated with the detected communication, one or more configurations of the user equipment, or a combination thereof, one or more public environmental data characteristics comprising known public information associated with the location of the user equipment, the time when the detected communication was detected, or a combination thereof, or a combination thereof.

8. The method of claim 1, wherein the selection of the mode for the detected communication is further based at least in part on one or more characteristics comprising private environmental data, the private environmental data comprising a user defined communication mode preference for a contact associated with the detected communication, a user defined communication mode preferences associated with a time of the detected communication, a user defined communication mode preferences associated with a location where the detected communication is sent or received, a user calendar event that occurs during a time of the detected communication, or a combination thereof.

9. The method of claim 1, wherein the user equipment comprises a mobile telephone.

10. The method of claim 1, wherein the using the one or more characteristics and a map generated by a trained machine learning model is performed by the user equipment.

11. The method of claim 1, wherein the method further comprises receiving, by the user equipment, the map generated by a trained machine learning model, wherein the map is based at least in part on at least one selected from the group consisting of a communication mode action with respect to a specific contact, a specific location not associated with public locations, a specific device available to a user, and an explicitly defined preference.

12. The method of claim 1, wherein the map is based at least in part on pre-known public information associated with a location.

13. A device for automatic communication mode selection, the system comprising:

one or more transceivers to send and receive communications in a plurality of different modes;

a memory coupled with the one or more transceivers; and one or more processors coupled with the memory and the one or more transceivers, wherein the one or more processors are configured to:

obtain a communication received by the one or more transceivers, determine one or more characteristics associated with the obtained communication, wherein the one or more characteristics comprise user environmental data, public environmental data, or a combination thereof associated with the obtained communication, and wherein the obtained communication is one of a voice communication, a text-based communication, an audiovisual-based communication, or a combination thereof, select a mode for the obtained communication that is different from an original mode of the obtained communication based on the one or more characteristics, wherein the selected mode for the obtained communication is a first mode of communication and the obtained communication is in a second mode of communication, and wherein the one or more processors are configured to select the mode for the obtained communication by using the one or more characteristics and a map generated by a trained machine learning model to map the obtained communication with the first mode of communication;

convert the obtained communication from the second mode of communication to the first mode of communication; and provide the converted communication to a user of the user equipment.

14. The device of claim 13, wherein the one or more processors are further configured to:

obtain a plurality of characteristics associated with a plurality of communications initiated or received by a plurality of users;

determine how each of the plurality of communications was handled by a communications initiator, a communications receiver, or both; and train the machine learning model for automatic communication mode selection based on how each of the plurality of communications was handled and one or more characteristics associated with each of the plurality of communications.

15. The device of claim 14, wherein the plurality of characteristics comprise one or more one or more environmental factors reported by a user equipment device that participated in a communication.

16. The device of claim 15, wherein the one or more processors are further configured to:

obtain a second plurality of characteristics associated with a second plurality of communications initiated or received by a user associated with the user equipment;

determine how each of the plurality of communications was handled by the user of the user equipment; and refine the trained machine learning model to generate a user-specific machine learning model for automatic communication mode selection based on how each of the plurality of communications was handled by the user of the user equipment.

17. The device of claim 16, wherein the one or more processors are further configured to:

receive private data from the user equipment, wherein the private data comprises at least user defined communication mode preferences per contact, user defined communication mode preferences per time preferences, user defined communication mode preferences per location, user calendar events data, or a combination thereof; and refine the trained machine learning model to generate a user-specific machine learning model for automatic communication mode selection based on the private data.

18. The device of claim 13, wherein the one or more processors are further configured to:

determine that the selected mode of communication is unavailable;

provide the obtained communication to a user of the user equipment in a different mode of communication regardless of the one or more characteristics associated with the obtained communication; and in response to a determination that the selected mode of communication becomes available, provide the obtained communication to the user of the user equipment in the selected mode of communication.

19. The device of claim 13, wherein the one or more characteristics comprising the user environmental data, public environmental data, or a combination thereof associated with the obtained communication comprise:

one or more user environmental data characteristics comprising a location of the user equipment, a type of the obtained communication, a type of the user equipment, a time associated with the obtained communication, an activity being performed by the user equipment, a contact associated with the obtained communication, one or more configurations of the user equipment, or a combination thereof, one or more public environmental data characteristics comprising known public information associated with the location of the user equipment, the time when the obtained communication was detected, or a combination thereof, or a combination thereof.

20. The device of claim 13, wherein the selection of the mode for the obtained communication is further based at least in part on one or more characteristics comprising private environmental data, the private environmental data comprising at least user defined communication mode preferences per contact, user defined communication mode preferences per time, user defined communication mode preferences per location, user calendar events data, or a combination thereof.

21. The device of claim 13, wherein the device comprises a mobile telephone.

22. The device of claim 13, wherein the using the one or more characteristics and a map generated by a trained machine learning model is performed within the user equipment.

23. The device of claim 13, wherein the one or more processors are further configured to receive, by the user equipment, the map generated by a trained machine learning model, wherein the map is based at least in part on at least one selected from the group consisting of a communication mode action with respect to a specific contact, a specific location not associated with public locations, a specific device available to a user, and an explicitly defined preference.

24. The device of claim 13, wherein the map is based at least in part on pre-known public information associated with a location.

25. An apparatus comprising:

means for detecting a communication by a user equipment;

means for determining one or more characteristics associated with the detected communication, wherein the one or more characteristics comprise user environmental data, public environmental data, or a combination thereof associated with the detected communication, and wherein the detected communication is one of a voice communication, a text-based communication, an audiovisual-based communication, or a combination thereof;

means for selecting a mode for the detected communication that is different from an original mode of the detected communication based on the one or more characteristics, wherein the selected mode for the detected communication is a first mode of communication and the detected communication is in a second mode of communication, and wherein the means for selecting the mode for the detected communication comprises means for using the one or more characteristics and a map generated by a trained machine learning model to map the detected communication with the first mode of communication;

means for converting the detected communication from the second mode of communication to the first mode of communication; and means for providing the converted communication to a user of the user equipment.

26. The apparatus of claim 25, wherein the means for using the one or more characteristics and a map generated by a trained machine learning model is within the user equipment.

27. The apparatus of claim 25, wherein the apparatus further comprises means for receiving, by the user equipment, the map generated by a trained machine learning model, wherein the map is based at least in part on at least one selected from the group consisting of a communication mode action with respect to a specific contact, a specific location not associated with public locations, a specific device available to a user, and an explicitly defined preference.

28. A non-transitory computer readable storage medium including instructions that, when executed by a processor, cause the processor to perform operations for automatic communication mode selection, the operations comprising:

detecting a communication by a user equipment;

determining one or more characteristics associated with the detected communication, wherein the one or more characteristics comprise user environmental data, public environmental data, or a combination thereof associated with the detected communication, wherein the detected communication is one of a voice communication, a text-based communication, an audiovisual-based communication, or a combination thereof;

selecting a mode for the detected communication that is different from an original mode of the detected communication based on the one or more characteristics, wherein the selected mode for the detected communication is a first mode of communication and the detected communication is in a second mode of communication, and wherein the selecting the mode for the detected communication comprises using the one or more characteristics and a map generated by a trained machine learning model to map the detected communication with the first mode of communication;

converting the detected communication from the second mode of communication to the first mode of communication; and providing the converted communication to a user of the user equipment.

29. The medium of claim 28, wherein the using the one or more characteristics and a map generated by a trained machine learning model is performed by the user equipment.

30. The medium of claim 28, wherein the medium further includes instructions that, when executed by the processor, cause the processor to perform receiving, by the user equipment, the map generated by a trained machine learning model, wherein the map is based at least in part on at least one selected from the group consisting of a communication mode action with respect to a specific contact, a specific location not associated with public locations, a specific device available to a user, and an explicitly defined preference.

* * * * *

UNITED STATES PATENT AND TRADEMARK OFFICE
CERTIFICATE OF CORRECTION

PATENT NO. : 10,165,105 B1
APPLICATION NO. : 15/709065
DATED : December 25, 2018
INVENTOR(S) : Ju-Yong Do et al.

It is certified that error appears in the above-identified patent and that said Letters Patent is hereby corrected as shown below:

In the Claims

In Column 17, Line 44, in Claim 7, change "thereof," to -- thereof; --.

In Column 17, Line 49, in Claim 7, change "thereof," to -- thereof; --.

In Column 18, Line 63, in Claim 15, delete "one or more one or more" and insert -- one or more --, therefor.

In Column 19, Line 49, in Claim 19, change "thereof," to -- thereof; --.

In Column 19, Line 55, in Claim 19, change "thereof," to -- thereof; --.

Signed and Sealed this
Nineteenth Day of February, 2019

Andrei Iancu
*Director of the United States Patent and Trademark Office*